(Model.)
G. RENTZ & F. H. HERZOG.
Fish and Game Trap.
No. 243,622.        Patented June 28, 1881.
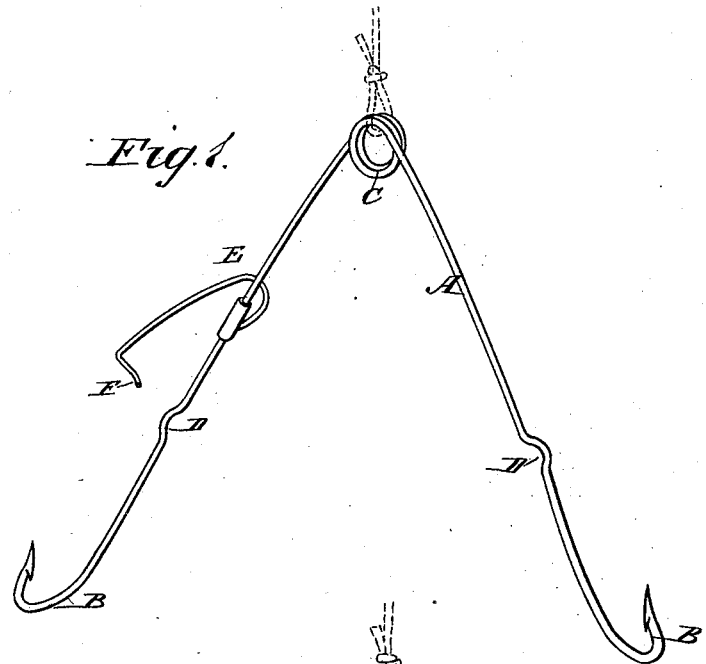
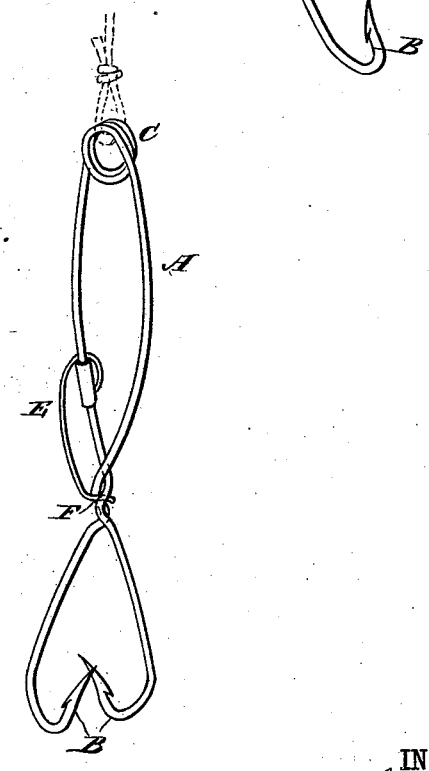
WITNESSES:
Francis McArdle
C. Sedgwick
INVENTOR:
G. Rentz
F. H. Herzog
BY Munn & Co
ATTORNEYS.

UNITED STATES PATENT OFFICE.

GOTTLIEB RENTZ AND FRANK. H. HERZOG, OF QUINCY, ILLINOIS.

FISH AND GAME TRAP.

SPECIFICATION forming part of Letters Patent No. 243,622, dated June 28, 1881.

Application filed April 26, 1881. (Model.)

*To all whom it may concern:*

Be it known that we, GOTTLIEB RENTZ and FRANK. H. HERZOG, of Quincy, Adams county, and State of Illinois, have invented a new and Improved Fish and Game Trap, of which the following is a specification.

Our invention consists in a wire with hooks at the ends, and a spring-coil in the middle, thus forming two shanks, which are provided with short bends to receive the end of a spring-trigger when the two shanks are crossed. When the animal bites or nibbles at the bait the spring-trigger snaps upward, thus releasing the spring-shanks, which are forced apart in the mouth of the animal.

In the accompanying drawings, Figure 1 is a perspective view of our improved fish and game trap, showing it open; and Fig. 2 is a perspective view of the same, showing it closed.

The wire is provided at the ends with the hooks B, and in the middle with a spring-coil, C, which forces the two shanks thus formed from each other. These shanks are provided with small circular or V-shaped opposite vertical bends D, at a distance from the hooks equal to about one-third of the length of the shanks, as shown. To one of the shanks a spring-wire, E, with an angularly-bent slightly-curved end, F, is attached in such a manner that this bent end F of the wire E will fit into the bends D. This double spring-hook can be attached to a fishing-line, or may be located in any suitable manner so that the bait can be discovered by the fish or game. The two shanks are crossed, as shown in Fig. 2, and the end F of the spring-wire E is passed in between two bends, D, and thus holds the shanks in the crossed position. The bait is then carefully attached to the hooks, or may be attached before crossing them. If an animal bites or nibbles on the bait, the wire E snaps upward and releases the spring-shanks, which are forced apart in the mouth of the animal.

Having thus described our invention, we claim as new and desire to secure by Letters Patent—

In a fish and game trap, the combination, with the wire A, provided with end hooks, B, opposite outward bends D, and a spring-coil, C, of the spring-trigger wire E, attached to one of the shanks, substantially as herein shown, and for the purpose set forth.

GOTTLIEB RENTZ.
FRANK. HENRY HERZOG.

Witnesses:
JOHN RENTZ,
AUGUST HERZOG.